United States Patent [19]

Garrett

[11] Patent Number: 4,706,517
[45] Date of Patent: Nov. 17, 1987

[54] AUTOMATIC POWER TRANSMISSION MECHANISM FOR A FOUR WHEEL DRIVE VEHICLE

[75] Inventor: Roy J. Garrett, Redford Township, Wayne County, Mich.

[73] Assignee: Ford Motor Company, Dearborn, Mich.

[21] Appl. No.: 789,803

[22] Filed: Oct. 21, 1985

[51] Int. Cl.⁴ .............................................. F16H 37/08
[52] U.S. Cl. .................. 74/665 T; 74/720.5; 180/247
[58] Field of Search ............... 180/247, 248, 249, 250; 74/665 GC, 665 S, 665 T, 720.5

[56] References Cited

U.S. PATENT DOCUMENTS

| | | | |
|---|---|---|---|
| 2,228,581 | 1/1941 | Olen | 180/250 X |
| 2,796,941 | 6/1957 | Hill | 180/249 |
| 2,850,920 | 9/1958 | Buckendale | 74/665 |
| 2,987,134 | 6/1961 | Myers | 180/247 |
| 3,095,758 | 7/1963 | Bixby | 74/701 |
| 3,191,708 | 6/1965 | Simonds et al. | 180/250 |
| 3,400,777 | 9/1968 | Hill | 180/249 |
| 3,401,763 | 9/1968 | Rolt | 180/44 |
| 3,492,890 | 2/1970 | Hill et al. | 180/249 X |
| 4,271,721 | 6/1981 | Yamamori et al. | 74/695 |
| 4,299,140 | 11/1981 | Kako et al. | 74/665 K |
| 4,307,628 | 12/1981 | Yamamori et al. | 74/608 R |
| 4,346,622 | 8/1982 | Pierce | 74/688 |
| 4,381,828 | 5/1983 | Lunn et al. | 180/247 |
| 4,509,389 | 4/1985 | Vahratian et al. | 74/695 |
| 4,520,690 | 6/1985 | Dangel | 180/249 X |

FOREIGN PATENT DOCUMENTS 787462 12/1957 United Kingdom ............... 180/247

Primary Examiner—Leslie Braun
Assistant Examiner—Dwight G. Diehl
Attorney, Agent, or Firm—Donald J. Harrington; Keith L. Zerschling

[57] ABSTRACT

A four wheel drive for a wheeled vehicle wherein the driver of the vehicle has the option of establishing a front wheel drive, a rear wheel drive, four wheel drive and four wheel lockup drive including multiple ratio gearing, a main geared differential and an interaxle geared differential.

1 Claim, 10 Drawing Figures

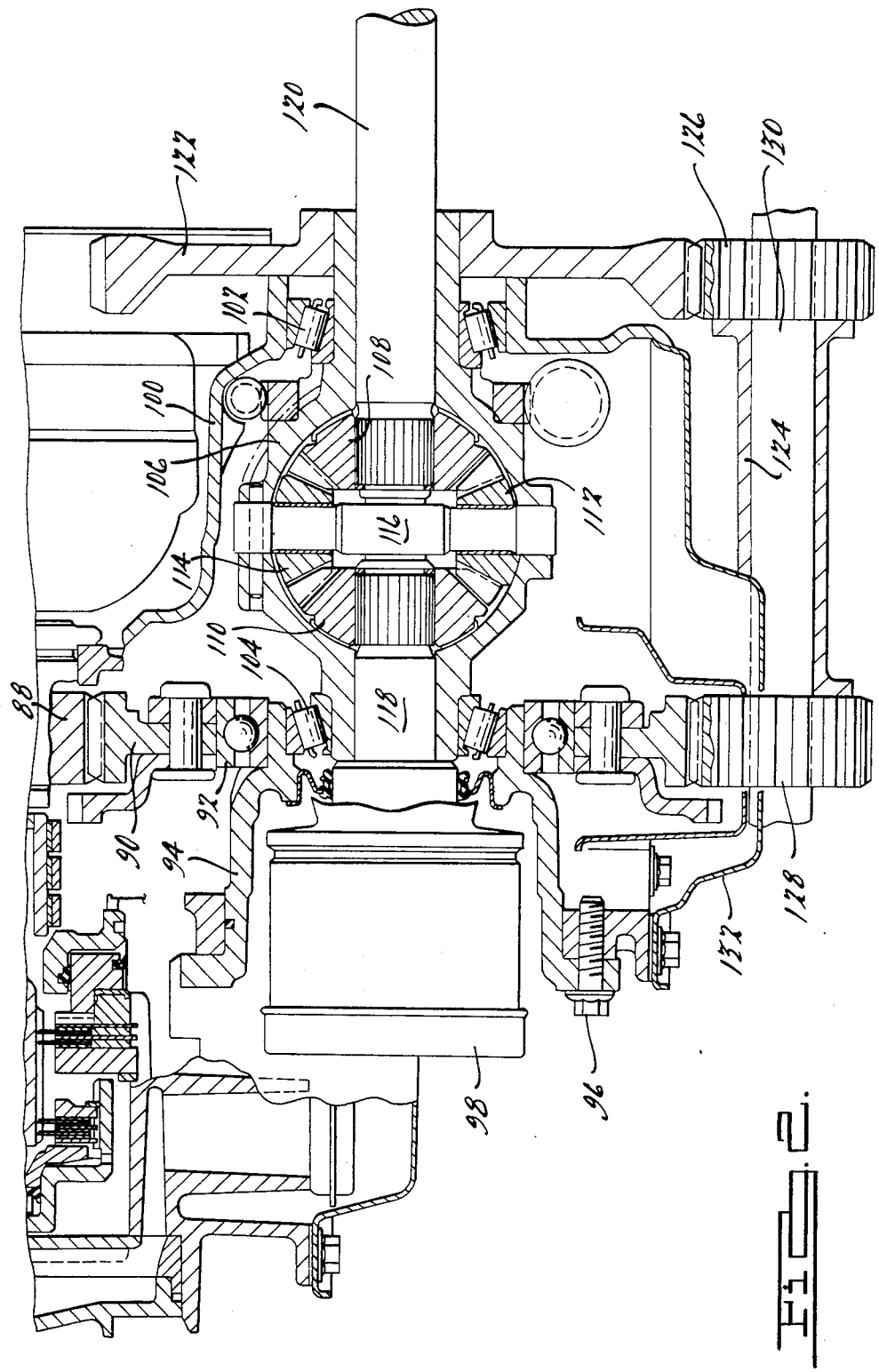

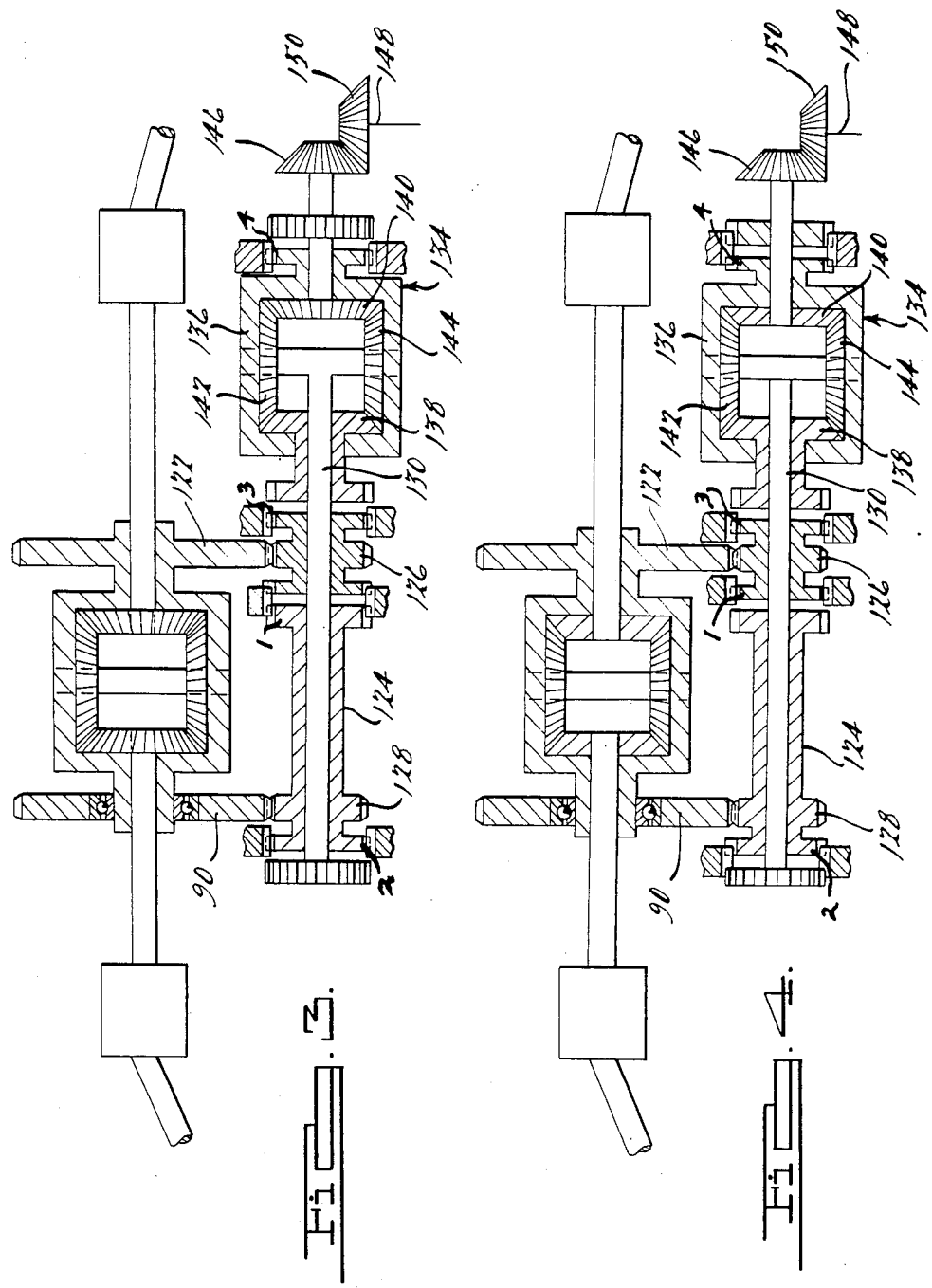

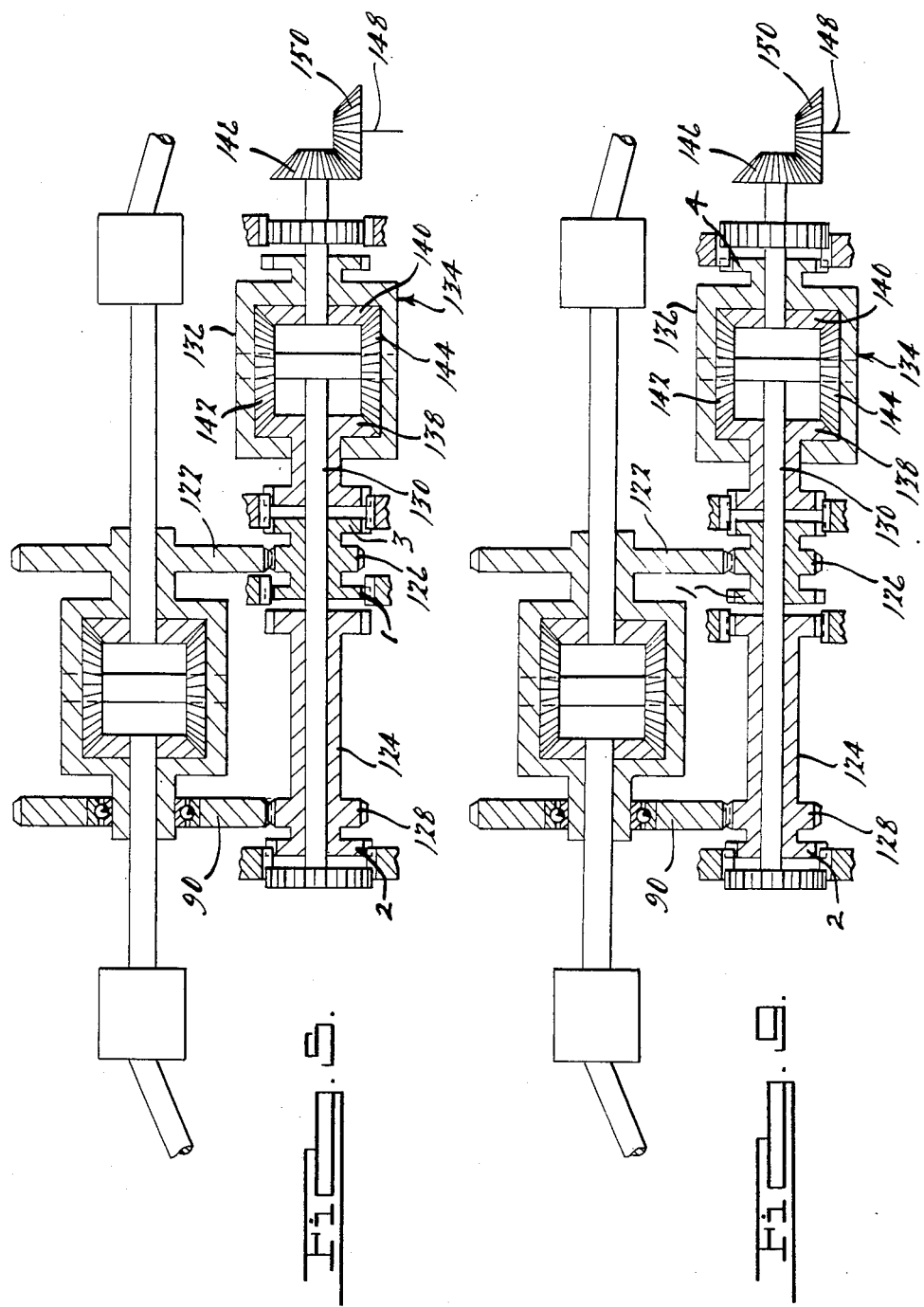

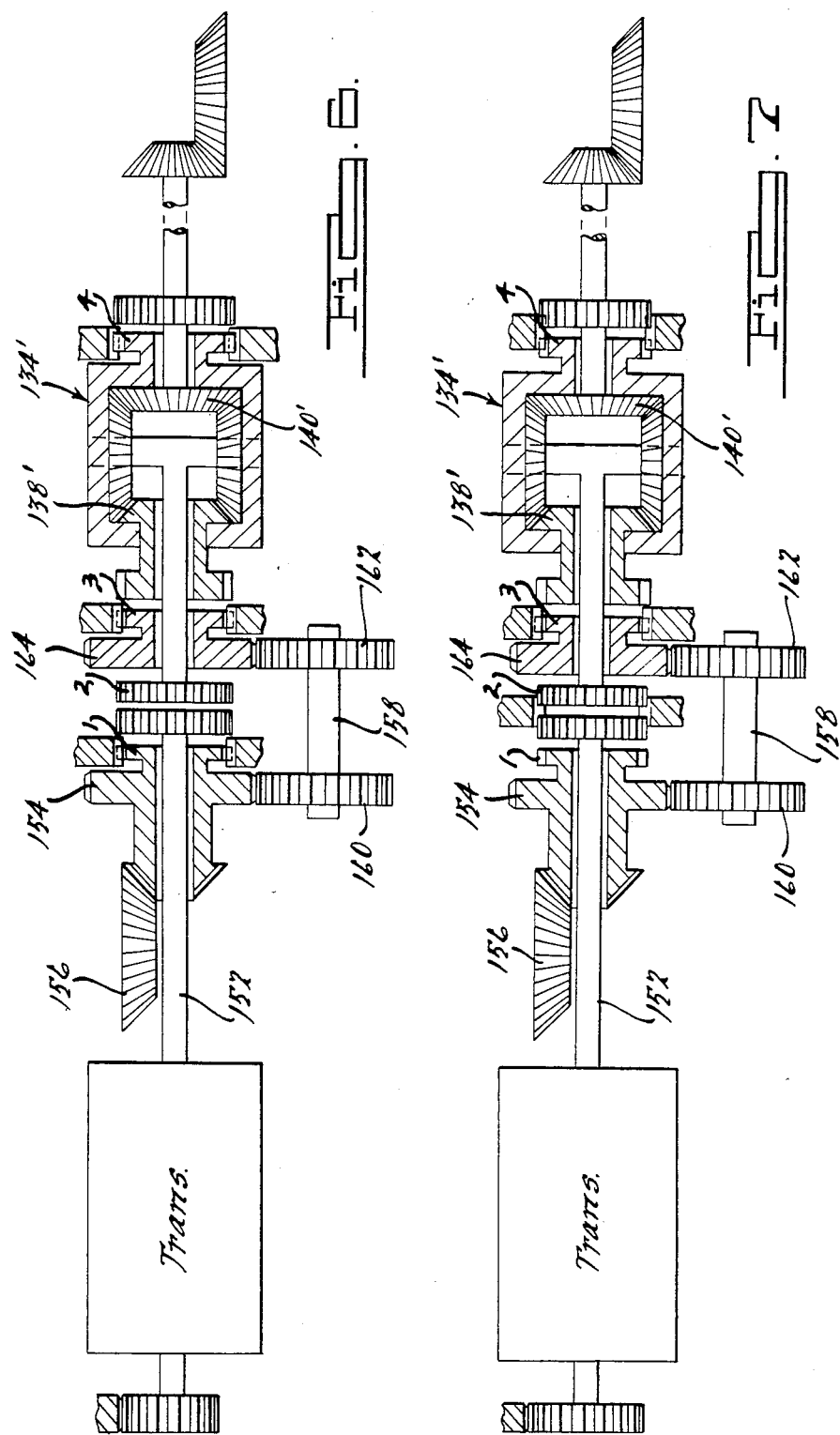

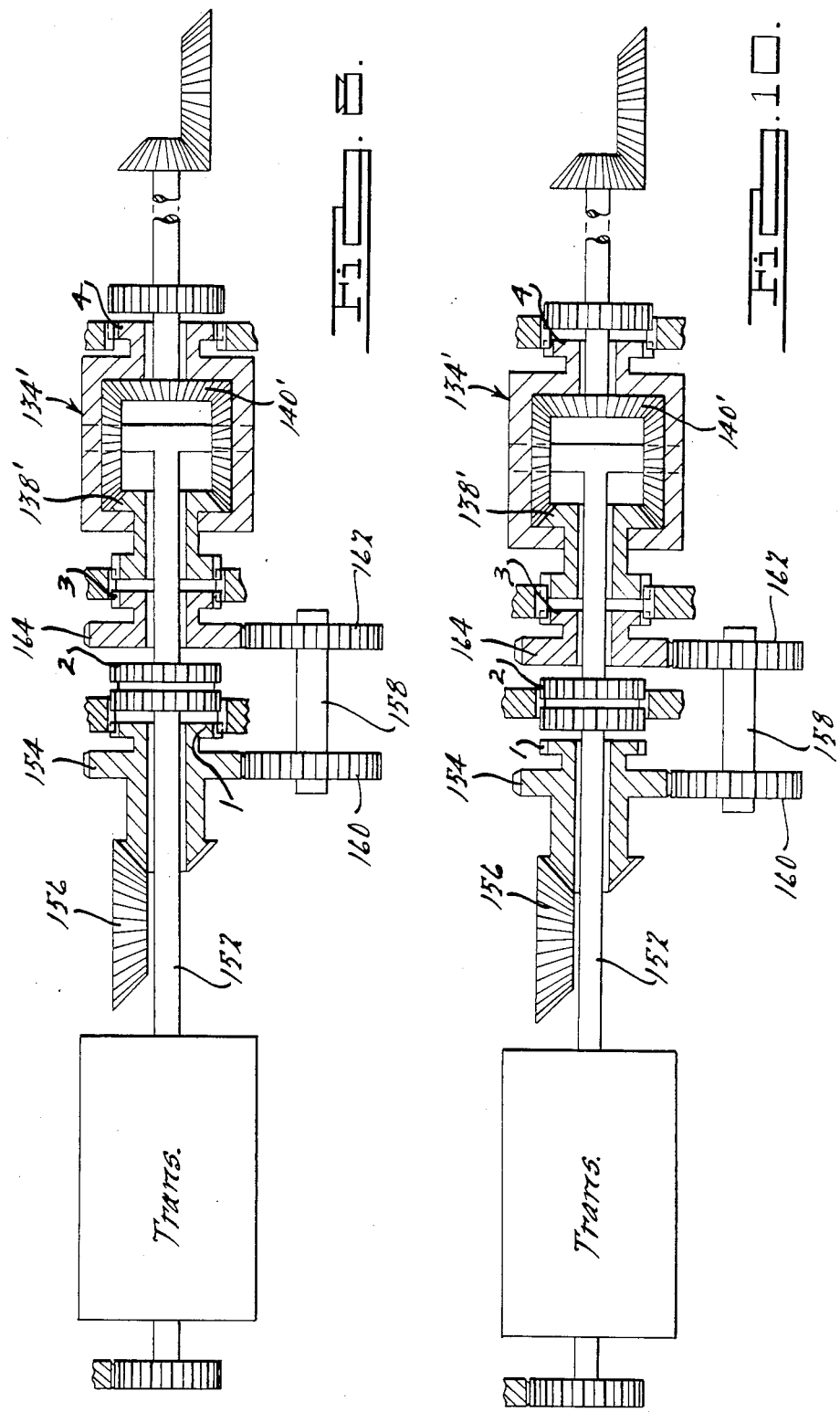

AUTOMATIC POWER TRANSMISSION MECHANISM FOR A FOUR WHEEL DRIVE VEHICLE

GENERAL DESCRIPTION OF THE INVENTION

My invention comprises improvements in a multiple ratio transmission mechanism for wheeled vehicles of the kind disclosed in U.S. Pat. No. 4,638,686, filed Mar. 26, 1980, by G. E. Lemieux et al. That application comprises a transaxle having a hydrokinetic torque converter and a three speed planetary gear set together with a final drive mechanism. That transaxle is adapted especially for front wheel drive vehicles wherein the engine is mounted transversely with respect to the center plane of the vehicle. My invention is useful also in transaxles of the type shown in U.S. Pat. No. 4,271,721, which is a four speed transmission for front wheel drive vehicles with a transversely disposed engine wherein the highest speed ratio is an overdrive. U.S. Pat. No. 4,638,686 and U.S. Pat. No. 4,271,721 are assigned to the assignee of this invention.

The improved construction of my invention makes it possible to use a basic transaxle of the kind shown in the aforementioned disclosures in a driveline that is capable of achieving, in addition to the front two wheel drive mode, a four wheel drive mode or a rear two wheel drive mode, depending upon the choice of the vehicle operator. The mechanism includes, in addition to the basic front wheel drive transmission structure, an interaxle differential mechanism and four selectively engageable clutches for establishing and disestablishing the various torque flow paths. The use of an independent rear suspension for the vehicle is possible by adding two half shafts and attaching the rear axle and differential mechanism to the frame. This is a matter of choice. The four wheel drive capability is achieved using the teachings of my invention without the necessity for raising the chassis of the vehicle to maintain a normal ground clearance.

BRIEF DESCRIPTION OF THE FIGURES OF THE DRAWINGS

FIGS. 1 and 2 show respectively the upper and lower portions of a three speed ratio transaxle converter and gear system for use in a wheeled vehicle.

FIG. 3 is a schematic representation of the torque flow delivery path established by the transaxle structure of FIGS. 1 and 2 together with a schematic representation of an interaxle differential and the clutches that are engaged or disengaged to effect a front wheel drive with the engine mounted transversely.

FIG. 4 is a view similar to FIG. 3 although the clutches are arranged to effect a rear wheel drive with a transverse engine.

FIG. 5, is a view similar to FIGS. 3 and 4 but with the clutches arranged to effect a four wheel drive with a transverse engine.

FIG. 6 shows a transmission system wherein the engine is mounted longitudinally with respect to the centerplane of the vehicle and wherein the axis of the interaxle differential is located on a common axis with the engine crankshaft and the drive shaft that powers the pinion for the rear differential and axle assembly. The clutches shown in FIG. 6 are arranged to provide a front wheel drive with a longitudinal engine.

FIG. 7 is a view similar to FIG. 6 although the clutches are arranged to provide a rear wheel drive with a longitudinal engine.

FIG. 8 is a view similar to the views of FIGS. 6 and 7 although the clutches are arranged to provide a four wheel drive with a longitudinal engine.

FIG. 9 is a view similar to FIGS. 2, 3, 4, and 5 although the clutches are arranged to provide a four wheel drive lockup with a transverse engine.

FIG. 10 is a schematic view similar to FIGS. 6, 7 and 8 although the clutches are arranged to provide a four wheel drive lockup with a longitudinal engine.

PARTICULAR DESCRIPTION OF THE INVENTION

Figure 1:
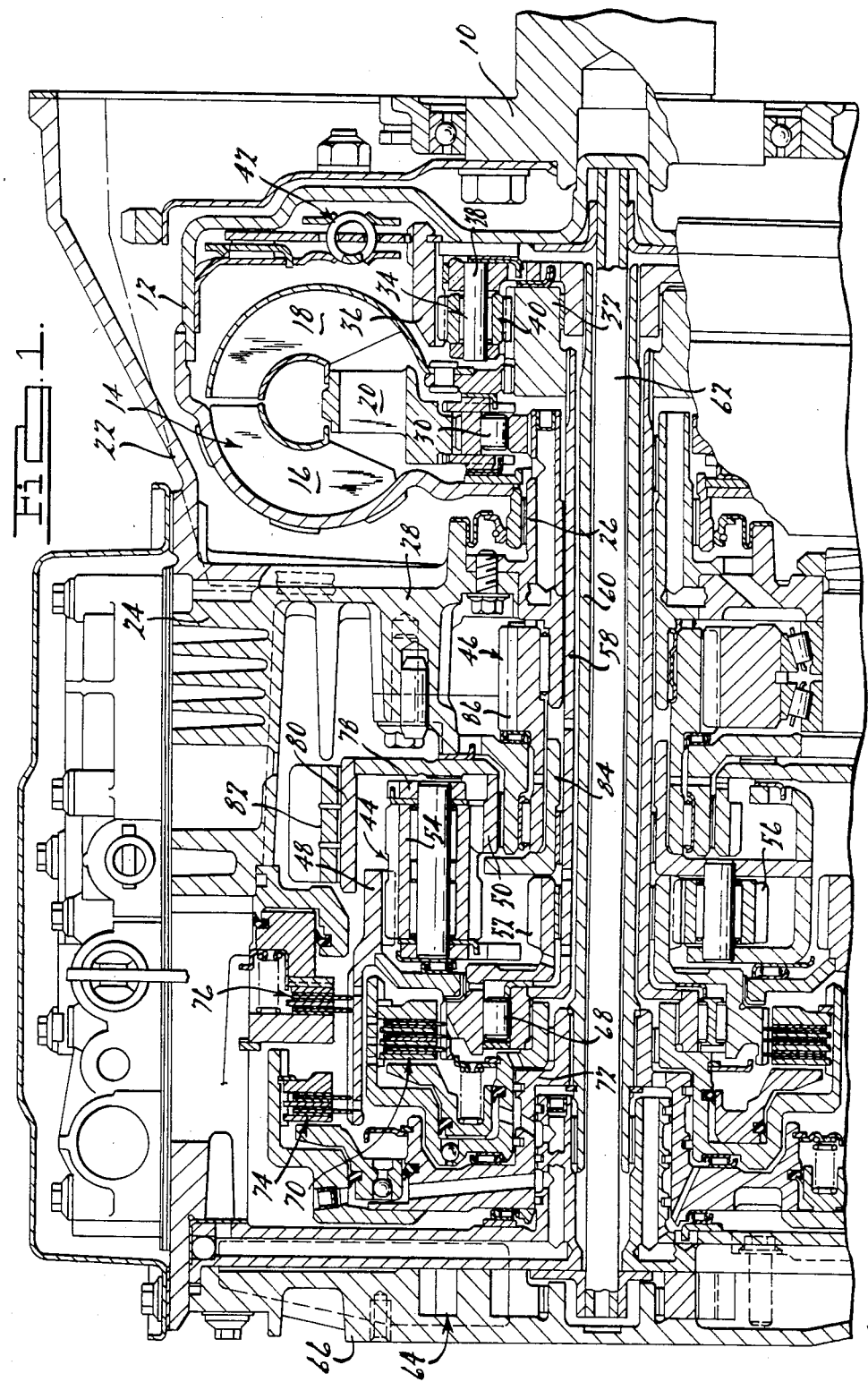

In FIG. 1 numeral 10 designates the crankshaft of a transversely mounted engine. It is connected drivably to the impeller shell 12 of a hydrokinetic torque converter 14. The converter 14 includes an impeller 16 in the impeller shell 12, which cooperates in toroidal flow relationship with turbine 18. Stator 20 is located between the flow exit section of the turbine and the flow entrance section of the impeller.

The converter 14 is enclosed in a transmission housing which includes converter housing portion 22 in planetary gear housing portion 24.

Stator 20 is supported by shaft 26 connected to housing wall 28 which forms a part of housing portion 24. Overrunning brake 30 transfers the hydrokinetic torque reaction from the stator 20 to the stationary sleeve shaft 26. Turbine 18 includes a hub that is splined directly to sun gear 32 of split torque planetary gear unit 34, which is located within the impeller housing portion 12. Gear unit 34 includes also ring gear 36, a carrier 38 and planetary pinions 40 supported by the carrier 38 in meshing engagement with sun gear 32 and ring gear 36. Ring gear 36 is connected to the hub of a damper assembly 42 which provides a driving connection between the impeller housing portion 12 and the ring gear 36.

A compound planetary gear system is located within housing portion 24 as shown at 44. A final drive gear system is located between planetary gear system 44 and the converter 14 as shown at 46.

Planetary gear system 44 includes ring gear 48, a large diameter sun gear 50, a small diameter sun gear 52, a set of long planet pinions 54 engageable with ring gear 48 and sun gear 50 and a set of short planet pinions 56 engageable with sun gear 52 and a set of planet pinions 54.

Sun gear 32 is splined to a turbine sleeve shaft 58 arranged concentrically with respect to a second torque input shaft 60. Shaft 60 is splined to carrier 38 of the simple planetary split torque gear unit 34. A pump drive shaft 62 is connected drivably to the crankshaft 10 at its right hand end and is connected to a positive displacement gear pump 64 which acts as a pressure source for the control circuit of the transmission. Pump 64 is located within a pump cover plate 66 located at the left end of the housing portion 24.

Sleeve shaft 58 is connected at its left end to sun gear 52 through an overrunning coupling 68.

A fluid pressure operated friction clutch assembly 70 connects drivably the inner race for the overrunning coupling 68 and the turbine sleeve shaft 58 to the sun gear 52 when it is engaged. Sleeve shaft 60 is connected by a spline to the hub 72 of a selectively operable fluid pressure operated clutch 74, which establishes a connection between sleeve shaft 60 and ring gear 48 when it is engaged. Ring gear 48 also can be braked by selectively operable friction brake 76 when the clutch 74 is released.

Carrier 78 of the planetary gear systsem 44 rotatably supports the pinion set 54 and the pinion set 56. The sun gear 50 is connected to brake drum 80 about which is positioned brake band 82. A fluid pressure operated brake servo, not shown, is used to engage brake band 82 to anchor the sun gear 50 during operation in the second speed ratio and in the first speed ratio. The carrier 78 has a hub 84 that is connected directly to output gear 86, which forms a part of the final drive gear 46. This gear 86 meshes with idler 88 which in turn engages a large diameter output gear 190 supported by bearing 92 on bearing support 94. An aperture in the housing portion 24 accommodates a universal joint 98 for the inboard end of one of the two axle half shafts for the front wheels of the vehicle. Bolts 96 secure support 94 to housing portion 24.

Housing portion 22 includes a bearing support 100 arranged in alignment with bearing support 94. It is provided with a bearing opening that receives differential carrier bearing 102. The corresponding bearing opening for the support 94 receives a differential carrier bearing 104. A carrier 106 is straddle mounted in the bearing 102 and 104. Differential side gears 108 and 110 are located in the carrier 106. These mesh with differential pinions 112 and 114 supported on cross shaft 116. Side gear 110 is splined to a first output shaft 118, which is connected to a first half shaft by the universal joint 98. The other side gear 108 is splined to the inboard end of another output shaft 120 which is adapted to be connected to a second half shaft by another universal joint, not shown, which would be similar to joint 98.

A torque output gear 122 is splined to the differential carrier 106. Thus gear 122 is supported by differential bearing 102. Gear 90 and gear 122 are connected drivably by means of an interaxle differential sleeve shaft 124, which is shown only schematically in FIG. 2, and by gears 126 and 128 which also are illustrated only schematically in FIG. 2. An interaxle differential torque input shaft 130 delivers torque from gear 90 to the interaxle differential where it is distributed to the vehicle rear wheels when it is active. The sleeve shaft 124, shaft 130 and gears 126 and 128 are situated in the lower region of the transmission structure in the vicinity of the oil pan 132.

When the transmission mechanism of FIGS. 1 and 2 is conditioned for first speed ratio operation, the brake band 82 is applied thereby anchoring the sun gear 50. Turbine torque then is distributed through the overrunning coupling 68 to sun gear 52. If engine braking in the first ratio is desired, clutch 70 can be applied. Torque then is distributed through the turbine shaft 58 and through the coupling 68. With sun gear 50 acting as a reaction point, the carrier 78 drives gear 86 of the final drive gear mechanism. Torque is distributed from gear 86 through gear 90 to sleeve shaft 124 and finally to output gear 122 which drives the differential carrier 106. Torque then is divided by the differential mechanism shown in FIG. 2 thus driving each of the axle half shafts for the vehicle front wheels.

To effect a ratio change to the second speed ratio, brake band 82 remains applied and clutch 74 is applied thereby distributing turbine torque from the shaft 58 to the ring gear 48. Overrunning coupling 68 then freewheels. A third speed ratio drive condition is established by engaging simultaneously clutches 74 and 70 which locks together the elements of the planetary gear mechanism 44 so that the planetary gear elements rotate in unison. Turbine torque then is distributed without torque multiplication directly from the turbine shaft 58 to the final drive gear 86.

Reverse drive is obtained by engaging brake 76 and clutch 70. With the ring gear 48 acting as a reaction point and with turbine torque from the turbine sleeve shaft 58 being distributed to the sun gear 52, the carrier 78 is driven in a reverse direction.

In FIG. 3 I have shown the interaxle differential in schematic form. It is designated by reference character 134. It includes a carrier housing 136 which encloses two side gears shown at 138 and 140. These gear engage differential pinions 142 and 144 which are journalled on the carrier housing 136. The carrier housing is connected directly to the shaft 130.

Side gear 140 is adapted to be connected to the drive pinion 146 of the differential and axle assembly for the vehicle rear wheels. The drive gear for the axis of the rear wheel axle is shown at 148. The drive ring gear for the rear wheel differential is shown at 150.

FIG. 3 shows four positive drive clutches each of which includes a shiftable clutch sleeve. The four positive drive clutches are identified by reference numerals 1, 2, 3 and 4, respectively. When the sleeve for clutch 1 is shifted to the position shown in FIG. 3, it connects drivably external teeth on the sleeve shaft 124 with external teeth on the gear 126, thus providing a torque flow path between the sleeve shaft 124 and the gear 122. This is the condition of the sleeves of the positive drive clutches that exists when the vehicle is conditioned for front wheel drive.

FIG. 4 shows the condition of the clutches 1, 2, 3 and 4 that exists when the driveline is adapted for rear wheel drive. In this case the sleeve for clutch 2 is moved to engage clutch teeth on the gear 128 and on the shaft 130 so that torque distributed to gear 90 is transferred through gear 128 and through shaft 130 to the interaxle differential 134.

FIG. 5 shows the positions of the sleeves for the clutches 1, 2, 3 and 4 when the vehicle driveline is conditioned for four wheel drive. In this case the sleeves for clutches 2 and 3 are moved to the position shown so that gear 128 becomes connected directly to shaft 130 and gear 126 becomes connected directly to the interaxle differential side gear 138.

It is possible, as shown in FIG. 9, to achieve a four wheel drive lockup condition where engine torque is distributed directly to each wheel without the effect of a torque balance that normally would be provided by the interaxle differential and the main differential shown in FIG. 2. In this instance the clutch sleeves 2, 3 and 4 are moved to the positions shown so that the gear 128 becomes locked to the shaft 130, gear 126 becomes locked to the interaxle differential side gear 138 and the other interaxle differential side gear 140 becomes locked to the interaxle differential carrier housing. This four wheel drive lockup condition would be used only in bad driving conditions and at low speeds. In each of the arrangements shown respectively in FIGS. 3, 4, 5, and 9 the engine would be mounted transversely with respect to the center plane of the vehicle.

FIGS. 6, 7, 8 and 10 show an embodiment of the driveline that would be adaptable for a longitudinally mounted engine—that is, the engine would be mounted with its crankshaft axis parallel to the center plane of the vehicle. In this instance torque from the output shaft 152 of the transmission would be distributed to a first drive gear 154 through the positive drive coupling sleeve for clutch 1. Gear 154 drives the pinion for the front wheel differential and axle assembly shown at 156. A countershaft gear assembly 158, which includes two drive gears 160 and 162, connects gear 154 with output gear 164. The latter may be connected to side gear 138' of the interaxle differential assembly 134' through the positive drive coupling sleeve for clutch 3, which includes a shiftable sleeve as in the case of the previously described arrangement. The other side gear 140' of the interaxle differential assembly 134' is adapted to be connected to the carrier housing of the interaxle differential assembly 134' by means of the positive drive coupling sleeve for clutch 4. Positive drive coupling sleeve for clutch 2 is adapted to connect the output shaft 152 of the transmission with the interaxle differential carrier housing when the coupling sleeve shown in FIG. 6 is shifted in a right hand direction. In the position shown in FIG. 6 the coupling sleeve for clutch 1, which is common to the clutch 2, is adapted to distribute torque only to the front wheels and the countershaft gearing is inactive. If rear wheel drive is desired, the clutches 1, 2, 3 and 4 assume the condition shown in FIG. 7 where clutch 2 connects directly the output shaft of the transmission with the interaxle differential carrier housing, the latter in turn being connected directly to the drive pinion 146' for the rear wheels.

FIG. 8 shows a four wheel drive condition where the clutch 1 distributes torque from the output shaft of the transmission to the front axle drive pinion 156, and clutch 3 distributes torque from the gear 164 to side gear 138'. A four wheel drive lockup condition can be achieved by engaging couplings 2, 3 and 4 simultaneously and releasing coupling 1. This condition is shown in FIG. 10.

It is possible to employ a chain drive in lieu of the gearing final drive of FIGS. 1 and 2. Such a chain drive is shown in U.S. Pat. No. 4,509,389, where torque is transferred from the turbine to an axis parallel to the axis of the turbine on the torque input side of the multiple ratio gearing.

It is apparent from the foregoing descriptions that I have provided a drive train that has multiple options—that is, it is possible for the vehicle operator to condition the driveline for front wheel drive, rear wheel drive, four wheel drive, or a lockup four wheel drive. The rear axle, the propeller shaft and the interaxle differential case are all inactive and do not move when they are not in use. This improves the fuel economy so that there is a minimum difference in the rate of fuel consumption during operation of the vehicle in good weather or bad weather. If there is a weight penalty resulting from the use of an interaxle differential assembly in addition to the assembly shown in FIGS. 1A and 1B, the weight penalty will be largely in the rear region of the vehicle where it can be used beneficially to provide improved traction.

Having described preferred embodiments of my invention, what I claim and desire to secure by U.S. Letters Patent is:

1. In a transmission for a vehicle having two forward traction wheels and two rear traction wheels:
   a multiple ratio transaxle having an input shaft adapted to be connected to an engine and arranged on a first axis and planetary gearing coaxially disposed relative to said input shaft and an output shaft;
   a first differential gear mechanism forming a part of said transaxle and having a torque output gear and side gears adapted to be connected to axle shafts for said forward wheels, said side gears having a second axis parallel to said first axis;
   a torque transfer drive means connecting said output shaft with said torque output gear including a first drive gear coaxially mounted relative to said torque output gear;
   an interaxle geared differential having a differential carrier and a pair of side gears, an interaxle torque input shaft having a third axis parallel to said second axis, said interaxle differential carrier being connected to said interaxle torque input shaft;
   a rear axle drive means connected to one of said interaxle differential side gears;
   a second drive gear and a third drive gear coaxially mounted with respect to said interaxle differential side gears, said third drive gear being engaged with said torque output gear, said second drive gear being engaged with said first drive gear; and
   first, second, third and fourth clutch means coaxially arranged with respect to said interaxle torque input shaft and independently actuatable for selectively connecting respectively (i) said third drive gear with said second drive gear, (ii) said second drive gear with said intermediate shaft, (iii) said third drive gear with the other side gear of said interaxle differential and (iv) said rear axle drive means with said carrier of said interaxle differential.

* * * * *